Figure 7:
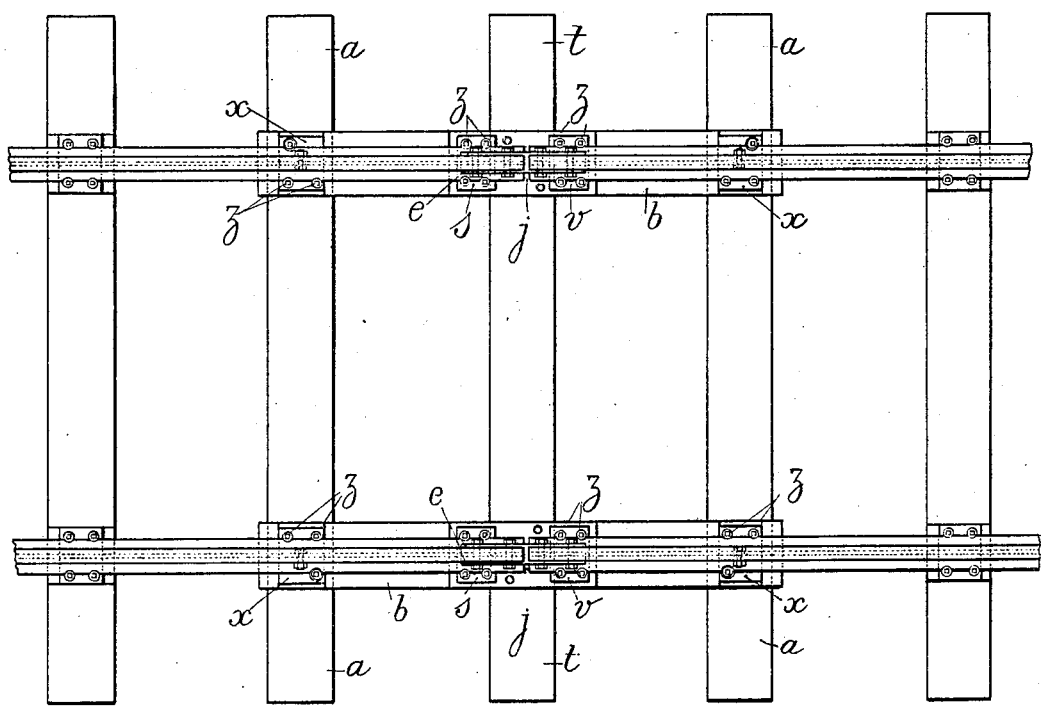

No. 682,051. Patented Sept. 3, 1901.
L. A. FARNET.
SYSTEM OF BONDING OR JOINTING RAILS IN RAILWAYS.
(Application filed Sept. 25, 1900.)
(No Model.) 2 Sheets—Sheet 1.
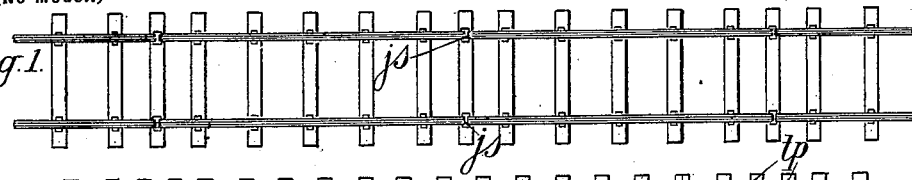
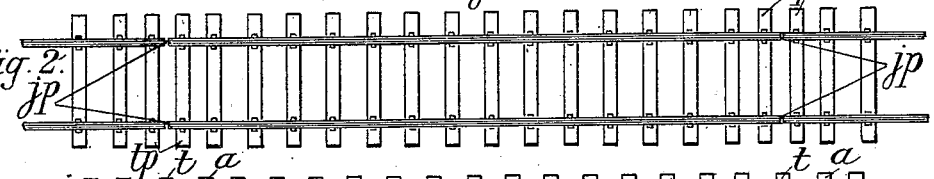
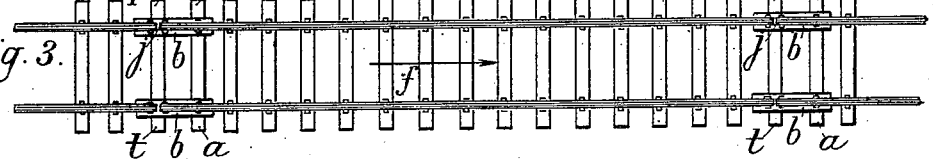
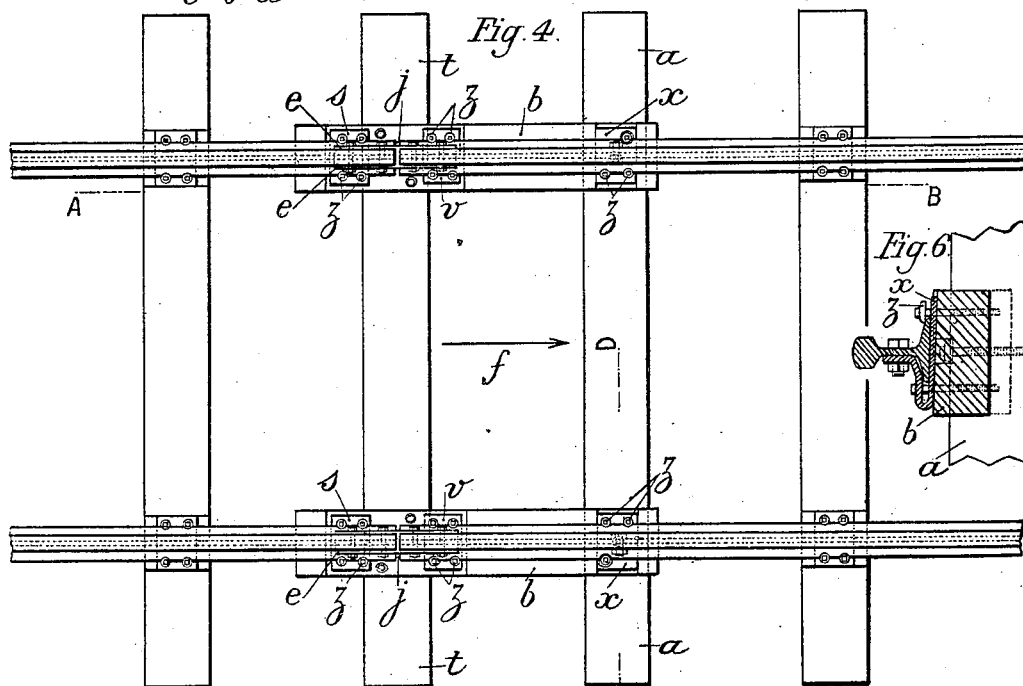
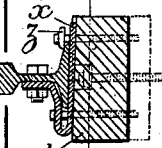
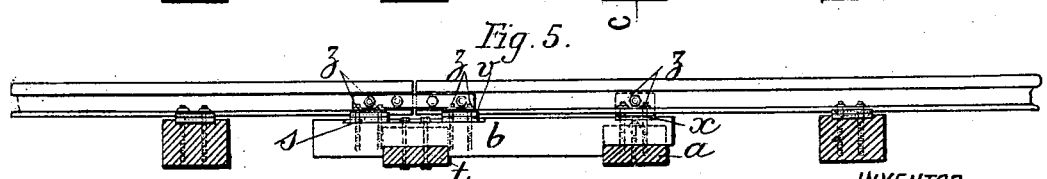
WITNESSES: INVENTOR
Ludovic Augustin Farnet
BY
Richardson
ATTORNEYS No. 682,051. Patented Sept. 3, 1901.
L. A. FARNET.
SYSTEM OF BONDING OR JOINTING RAILS IN RAILWAYS.
(Application filed Sept. 25, 1900.)
(No Model.) 2 Sheets—Sheet 2.

WITNESSES:

INVENTOR
Ludovic Augustin Farnet
BY
Richards

ATTORNEYS

UNITED STATES PATENT OFFICE.

LUDOVIC AUGUSTIN FARNET, OF MONTEREAU, FRANCE.

SYSTEM OF BONDING OR JOINTING RAILS IN RAILWAYS.

SPECIFICATION forming part of Letters Patent No. 682,051, dated September 3, 1901.

Application filed September 25, 1900. Serial No. 31,075. (No model.)

*To all whom it may concern:*

Be it known that I, LUDOVIC AUGUSTIN FARNET, of Montereau, in the department of Seine-et-Marne, in the Republic of France, have invented a certain new and useful Novel System of Bonding or Jointing Rails in Railways; and I do hereby declare the following to be a full, clear, and exact description of the invention, such as will enable others skilled in the art to which it appertains to make and use the same.

Laying and bonding rails in railways is a matter of considerable importance, both from the point of view of the maintenance of the permanent way and of the ease and comfort in traveling. At present two methods of jointing or bonding are generally in use—the method of "supported" joint or bond and the method of a "cantaliver" joint or bond. In the supported-joint system the ends of the rails placed end to end are jointed on a sleeper by any suitable means. This system of joint or bond has the great disadvantage of rendering the permanent way very unyielding. When passing over the joint or bond, the vehicles receive very perceptible shocks, highly disagreeable to the passengers. In addition, the sleepers on which the joints or bonds are made give out rapidly, with the result that frequent and often costly repairs become necessary. This method of junction is consequently but seldom employed. Preference is in consequence generally given to the cantaliver-bond. In this system the extremities of the rails placed end to end are bonded between two sleepers by fish-plates and bolts or other means. This method produces much more easy traveling than the preceding, but is also subject to very serious disadvantages. In order to reduce the cantalivered or overhanging portion of the rails, the practice has been to bring the two sleepers on each side of the joint as close together as possible; but there is a limit to this imposed by the necessity of being obliged to pack up the rail with ballast between the sleepers. However close the sleepers can in practice be brought, a certain length of rail will still of necessity hang over. The reduction of this cantalivered portion has in any case the effect of reducing considerably the resistance of the joint or bond, which is the weak point of the track; but hitherto no practical means have been devised for attaining this end. The cantaliver-joint is deficient in rigidity. The ends of the rails soon get out of the true and owing to the shock of the wheels get flattened down and rendered useless in a few years. Lines constructed with joints of this kind involve high-maintenance charges. Finally, the ordinary joint or bond does not provide sufficient resistance to lateral thrust or to creeping.

The invention forming the subject of the present application has for its object to remedy these inconveniences by means of the devices about to be described.

In order that my invention may be the more readily and completely understood, I hereby refer to the accompanying sheets of drawings, in which—

Figure 8:
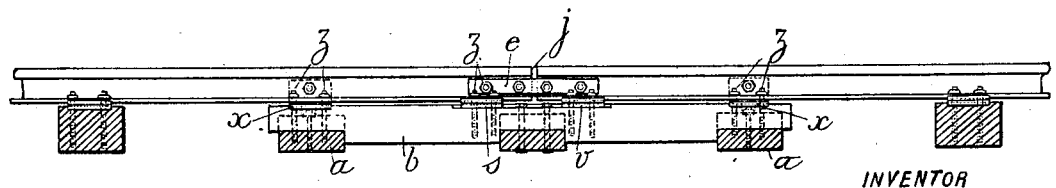

Figures 1 and 2 show the methods of jointing or bonding hitherto in use, the nature and disadvantages of which have been already described. Fig. 3 is a plan of a portion of the track, in which the rails are shown jointed or bonded in accordance with my novel system of construction. Fig. 4 shows, on a larger scale, the details of the joints or bonds. Fig. 5 is a section along the plane A B. Fig. 6 is a section along the plane C D. Fig. 7 shows in plan my invention applied to a monorail system. Fig. 8 is a section in a vertical plane through one of the parts of Fig. 7.

At the place where the joint or bond is to be made I construct a frame by arranging on two ordinary sleepers $t\ t\ a\ a$ longitudinal struts or distance-pieces, both the sleepers and struts being recessed, so as to dovetail or mortise into one another, as shown in Figs. 5 and 6, and further secured by suitable bolts, the whole forming together a rigid framework. The space between the sleepers $t\ t$ and $a\ a$ is equal to the average distance between the centers of any two ordinary sleepers, so that ballast can be packed in under the rails without difficulty.

In laying down the track the rigid framework above described is so arranged that the rails repose over the middle of the struts or distance-pieces $b\ b$, and the actual joint is so made that the space between the ends of the two adjacent rails is approximately over the central line of the sleeper *t t*. The trains are supposed to travel in the direction of the arrow *f*. The chairs *s v x* are mounted on the frame, the rails being bonded by ordinary fish-plates *e*. Holding-down bolts *z* serve to secure the rails in position. Mere inspection of Figs. 4 and 5 of the drawings suffices to show that the joint or bond *j* is situated over a sleeper, but that the rails themselves do not touch the sleeper, but that their ends are actually cantalivers. The lengths of the cantaliver portions, however,—that is to say, the portions projecting beyond the chairs—are very much reduced in length owing to the struts *b b* enabling the chairs to be mounted in the position shown. To secure ease in traveling, it is necessary that the projecting or cantaliver portions of each rail should not exceed ten or twelve centimeters. This I can obtain with facility, as I can alter the distance between the chairs as desired. With this arrangement the bending of the rail ends is very slight and the resulting wear almost eliminated. The rigidity of the joint, while at the same time improving the track, enables considerable economy in the cost of maintenance to be obtained. The sleepers where the joint is made being at the ordinary distance apart, the ballast can be packed with the greatest facility. In addition the frames above described, in virtue of the manner in which they are arranged and constructed, confer a high degree of resistance upon the track, opposed to all displacements, whether tending to occur longitudinally or laterally.

The method of construction above described is specially applicable to tracks with two lines of rails, in which the traffic proceeds in the direction shown by the arrow *f*; but it may be equally well applied to a monorail system, as shown in Figs. 7 and 8. In this case the longitudinal struts are made somewhat longer, so as to be able to rest upon three sleepers—that is to say, the sleeper upon which the joint or bond is made and on one on each side of it—with this difference, the arrangement in this latter case is identical with that previously described.

I claim—

In combination in a railway-track, a cross-tie located directly below the meeting ends of the rails, a longitudinal sleeper extending from said cross-tie in the direction a train runs on said track, to the next adjacent cross-tie, a connection between the longitudinal sleeper and the down-rail above said second cross-tie and chairs resting on the longitudinal sleeper and supporting said meeting-rails adjacent to but a sufficient distance from the ends of the same to provide a slight overhang.

In witness whereof I have hereunto set my hand in presence of two witnesses.

LUDOVIC AUGUSTIN FARNET.

Witnesses:
 EDWARD P. MACLEAN,
 ANDRÉ MOSTICKER.